(12) United States Patent
Walker, II (10) Patent No.: US 11,273,503 B2
(45) Date of Patent: Mar. 15, 2022

(54) GRIPPING SURFACE APPARATUSES

(71) Applicant: Bear Walker Industries, LLC, Daphne, AL (US)

(72) Inventor: Randolph D. Walker, II, Daphne, AL (US)

(*) Notice: Subject to any disclaimer, the term of this patent is extended or adjusted under 35 U.S.C. 154(b) by 0 days.

(21) Appl. No.: 16/927,868

(22) Filed: Jul. 13, 2020

(65) Prior Publication Data

US 2021/0008651 A1 Jan. 14, 2021

Related U.S. Application Data

(60) Provisional application No. 62/873,242, filed on Jul. 12, 2019.

(51) Int. Cl.
| | | |
|---|---|---|
| *B23C 9/00* | (2006.01) | |
| *A63C 17/01* | (2006.01) | |
| *E04F 11/17* | (2006.01) | |
| *E04F 15/02* | (2006.01) | |
| *B62K 3/00* | (2006.01) | |

(52) U.S. Cl.
CPC ............... *B23C 9/00* (2013.01); *A63C 17/017* (2013.01); *A63C 2203/42* (2013.01); *B62K 3/002* (2013.01); *E04F 11/17* (2013.01); *E04F 15/02172* (2013.01); *E04F 15/02183* (2013.01)

(58) Field of Classification Search
CPC .... A63C 17/01; A63C 17/017; A63C 2203/42
See application file for complete search history.

(56) References Cited

U.S. PATENT DOCUMENTS

| | | | | |
|---|---|---|---|---|
| 4,337,963 A | * | 7/1982 | Stevenson | A63C 17/017 280/610 |
| 5,622,759 A | * | 4/1997 | Fuster | A63C 5/124 280/87.01 |
| 7,854,068 B2 | * | 12/2010 | Di Benedetto | B23Q 15/14 33/18.1 |
| 2006/0125199 A1 | * | 6/2006 | Kodames | A63C 17/01 280/87.042 |
| 2014/0103613 A1 | * | 4/2014 | Gomez | B32B 5/12 280/11.19 |
| 2014/0375009 A1 | * | 12/2014 | Willis | B24C 1/04 280/87.042 |
| 2017/0107011 A1 | * | 4/2017 | Melland | E04C 2/326 |
| 2019/0209913 A1 | * | 7/2019 | Koch | A63C 17/004 |

* cited by examiner

*Primary Examiner* — Brian L Swenson
(74) *Attorney, Agent, or Firm* — Bradley Arant Boult Cummings; Timothy L. Capria; Jonathan C. "Rudy" Hill (57) ABSTRACT

A gripping surface includes a plurality of projections extending away from the gripping surface and a plurality of voids between and defined by the projections. The gripping surface may be disposed on a support surface, such as a deck of a skateboard or a deck of a balance board. The projections may be formed by cutting the support surface with a router, such as a computer numerical control router. The projections may each comprise three or more angles surfaces, whereby angled surfaces of proximal projections are positioned at mirror angles of one another.

21 Claims, 11 Drawing Sheets

GRIPPING SURFACE APPARATUSES

CROSS-REFERENCE TO RELATED APPLICATION

This application claims the benefit of U.S. Provisional Patent Application No. 62/873,242, filed Jul. 12, 2019, which is incorporated by reference herein in its entirety.

TECHNICAL FIELD

The present disclosure relates skateboards and apparatuses having a gripping surface and methods of making the same. In particular, the gripping surface includes a plurality of outwardly extending projections and a plurality of voids between and defined by the plurality of projections.

BACKGROUND OF INVENTION

Maintaining contact with supporting surfaces presents a frequent problem for people with a need for a better solution. For example, wooden floors often present the risk of slips and falls, as wooden floors (e.g., indoor hardwood or outdoor wooden decking) become particularly slippery when wet or cleaned. Indeed, According to the Consumer Product Safety Commission (CPSC), floors and flooring materials contribute directly to more than 2 million fall injuries each year. The risk of falls is particularly acute in older persons, as each year in the U.S., one of every three persons over the age of 65 experiences a fall.

The problem of improving grip on support surfaces is not limited to older people. For example, the problem potentially extends to any supporting surface upon which a person may stand, including boards such as balance boards and skateboards. It is important that a board rider maintain (typically foot) contact, when desired, with a board to prevent falls and injuries and to maintain control of the board. However, as boards are typically constructed of wood, they are often slippery and have a top surface that does not enable the rider to maintain sufficient contact. To address this problem, "grip tapes" are currently used in which the supporting top surface of the board is covered with a tape that includes grit, sand, or a similar material, such that the user can better maintain contact with the board. Problems associated with grip tape are fast wear, additional expense, additional maintenance, safety concerns with new tape being applied on top of old tape, and thus, an insecure surface, and an unaesthetic appearance.

Thus, there is a need in the art for a gripping surface that is durable, safe, and aesthetically pleasing. Ideally, the gripping surface should be usable on different types of support surfaces, such as stair treads, decking, balance boards decks, scooter support decks, skateboard decks, and wooden flooring.

BRIEF SUMMARY

In one aspect, a board deck, such as a deck of a skateboard or a balance board, is disclosed. The board deck may comprise one or more wheels mounted on one or more axles. The board comprises a deck having a bottom, the bottom connected to the axle(s). The deck includes a top disposed on the deck opposite of the axle(s) and the bottom. The deck includes a gripping surface disposed on the top. The gripping surface includes a plurality of projections extending away from the deck and a plurality of voids between and defined by the plurality of projections. The plurality of projections and the plurality of voids may be arranged in a geometric pattern on the gripping surface. The plurality of projections may each have a generally pyramidal profile or a generally trapezoidal profile. The plurality of projections may be formed by cutting (such as with a computer numerical control router) a portion of the deck at the gripping surface. The plurality of projections may each include a projection tip, a first angled surface, a second angled surface, and a third angled surface. The projections may include a fourth, or even still further, angled surfaces. Each of the angled surfaces may extend upwardly and inwardly to the projection tip from the deck. Each of the angled surfaces may be disposed around the projection tip.

The plurality of projections comprise a first projection and one or more proximal projections. One of the angled surfaces of each of the one or more proximal projections may be a mirror of one of the angled surfaces of the first projection. The plurality of projections and voids may be disposed across the gripping surface. The gripping surface may be disposed on a substantial portion of the top.

The deck may be constructed of wood, such as maple wood. The deck may comprise a raised lip disposed around the gripping surface of the deck.

In another aspect, a support surface is provided. The support surface comprises a body having a bottom surface and a top surface oppositely disposed on the body from the bottom surface. The support surface includes a gripping surface disposed on the top surface of the body. The gripping surface includes a plurality of projections extending away from the body and a plurality of voids between and defined by the plurality of projections. Each of the plurality of projections includes a projection tip, a first angled surface, a second angled surface, and a third angled surface (or additional angled surfaces). Each of the angled surfaces extends upwardly and inwardly to the projection tip from the body. Each of the angled surfaces may be disposed around the projection tip. The plurality of projections may be arranged in a repeating geometric pattern. The plurality of projections and the plurality of voids may be formed by cutting the top surface with a computer numerical control router.

The support surface may be selected from the group consisting of a wood flooring, a wood decking, a wood stair tread, a skateboard deck, a balance board deck, and a scooter deck. The gripping surface may be disposed across a substantial portion of the top surface.

In yet another aspect, a method for creating a gripping surface on a substrate is provided. The method includes providing a substrate including a body having a top surface. The method includes cutting the top surface to form a plurality of projections and a plurality of voids. Each of the plurality of projections includes a projection tip, a first angled surface, a second angled surface, and a third angled surface (or additional angled surfaces). Each of the angled surfaces extends upwardly and inwardly to the projection tip from the body. Each of the angled surfaces may be disposed around the projection tip. The substrate may be selected from the group consisting of a wood flooring, a wood decking, a wood stair tread, a skateboard deck, a balance board deck, and a scooter deck. The plurality of projections and the plurality of voids may form a geometric pattern across at least a portion of the top surface.

BRIEF DESCRIPTION OF DRAWINGS

It should be noted that identical features in different drawings are shown with the same reference numeral.

DETAILED DESCRIPTION

Reference now will be made in detail to the embodiments of the present disclosure. It will be apparent to those of ordinary skill in the art that various modifications and variations can be made to the teachings of the present disclosure without departing from the scope of the disclosure. For instance, features illustrated or described as part of one embodiment can be used with another embodiment to yield a further embodiment.

Thus, it is intended that the present disclosure covers such modifications and variations as come within the scope of the appended claims and their equivalents. Other objects, features, and aspects of the present disclosure are disclosed in or are apparent from the following description. It is to be understood by one of ordinary skill in the art that the present disclosure is a description of exemplary embodiments only and is not intended as limited the broader aspects of the present disclosure.

For the sake of clarity, not all reference numerals are necessarily present in each drawing Figure. In addition, positional terms such as "upper," "lower," "side," "top," "bottom," "vertical," "horizontal," etc. refer to embodiments when in the orientation shown in the drawings. The skilled artisan will recognize that embodiments described herein can assume different orientations when in use.

The described systems and techniques, and elements thereof, may be performed by a computer system that includes a single computer or more than one computer. A computer may be a processor-controlled device, such as, by way of example, personal computers, workstations, servers, clients, mini-computers, mainframe computers, laptop computers, smartphones, tablets, a network of one or more individual computers, mobile computers, portable computers, handheld computers, palmtop computers, set-top boxes for a TV, interactive televisions, interactive kiosks, personal digital assistants, interactive wireless devices, or any combination thereof.

A computer may be a uniprocessor or multiprocessor machine. Accordingly, a computer may include one or more processors and, thus, the aforementioned computer system may also include one or more processors. Examples of processors include sequential state machines, microprocessors, microcontrollers, graphics processing units (GPUs), central processing units (CPUs), application processors, digital signal processors (DSPs), reduced instruction set computing (RISC) processors, systems on a chip (SoC), baseband processors, field-programmable gate arrays (FPGAs), programmable logic devices (PLDs), gated logic, and other suitable hardware configured to perform the various functionality described throughout this disclosure.

Additionally, the computer may include one or more memories. Accordingly, the aforementioned computer systems may include one or more memories. A memory may include a memory storage device or an addressable storage medium which may include, by way of example, random access memory (RAM), static random access memory (SRAM), dynamic random access memory (DRAM), electronically erasable programmable read-only memory (EEPROM), programmable read-only memory (PROM), erasable programmable read-only memory (EPROM), hard disks, floppy disks, laser disk players, digital video disks, compact disks, videotapes, audiotapes, magnetic recording tracks, magnetic tunnel junction (MTJ) memory, optical memory storage, quantum mechanical storage, electronic networks, and/or other devices or technologies used to store electronic content such as programs and data.

In particular, the one or more memories may store computer-executable instructions that, when executed by the one or more processors, cause the one or more processors to implement the procedures and techniques described herein. The one or more processors may be operably associated with the one or more memories so that the computer-executable instructions can be provided to the one or more processors for execution. For example, the one or more processors may be operably associated to the one or more memories through one or more buses. Furthermore, the computer may possess or may be operably associated with input devices (e.g., a keyboard, a keypad, controller, a mouse, a microphone, a touch screen, a sensor) and output devices such as (e.g., a display such as a computer screen, printer, or a speaker).

The computer may execute an appropriate operating system such as LINUX®, UNIX®, MICROSOFT® WINDOWS®, APPLE® MACOS®, IBM® OS/2®, ANDROID®, and PALM® OS, and/or the like. The computer may advantageously be equipped with a network communication device such as a network interface card, a modem, or other network connection device suitable for connecting to one or more networks.

A computer may advantageously contain control logic, or program logic, or other substrate configuration representing data and instructions, which cause the computer to operate in a specific and predefined manner as described herein. In particular, the computer programs, when executed, enable a control processor to perform and/or cause the performance of features of the present disclosure. The control logic may advantageously be implemented as one or more modules. The modules may advantageously be configured to reside on the computer memory and execute on the one or more processors. The modules include, but are not limited to, software or hardware components that perform certain tasks. Thus, a module may include, by way of example, components such as software components, processes, functions, subroutines, procedures, attributes, class components, task components, object-oriented software components, segments of program code, drivers, firmware, micro-code, circuitry, data, and/or the like.

The control logic conventionally includes the manipulation of digital bits by the processor and the maintenance of these bits within memory storage devices resident in one or more of the memory storage devices. Such memory storage devices may impose a physical organization upon the collection of stored data bits, which are generally stored by specific electrical or magnetic storage cells.

The control logic generally performs a sequence of computer-executed steps. These steps generally require manipulations of physical quantities. Usually, although not necessarily, these quantities take the form of electrical, magnetic, or optical signals capable of being stored, transferred, combined, compared, or otherwise manipulated. It is conventional for those skilled in the art to refer to these signals as bits, values, elements, symbols, characters, text, terms, numbers, files, or the like. It should be kept in mind, however, that these and some other terms should be associated with appropriate physical quantities for computer operations, and that these terms are merely conventional labels applied to physical quantities that exist within and during operation of the computer based on designed relationships between these physical quantities and the symbolic values they represent.

It should be understood that manipulations within the computer are often referred to in terms of adding, comparing, moving, searching, or the like, which are often associated with manual operations performed by a human operator. It is to be understood that no involvement of the human operator may be necessary, or even desirable. The operations described herein are machine operations performed in conjunction with the human operator or user that interacts with the computer or computers.

It should also be understood that the programs, modules, processes, methods, and the like, described herein are but an exemplary implementation and are not related, or limited, to any particular computer, apparatus, or computer language. Rather, various types of general-purpose computing machines or devices may be used with programs constructed in accordance with some of the teachings described herein. In some embodiments, very specific computing machines, with specific functionality, may be required. Similarly, it may prove advantageous to construct a specialized apparatus to perform the method steps described herein by way of dedicated computer systems with hard-wired logic or programs stored in nonvolatile memory, such as, by way of example, read-only memory (ROM).

In some embodiments, features of the computer systems can be implemented primarily in hardware using, for example, hardware components such as application-specific integrated circuits (ASICs) or field-programmable gated arrays (FPGAs). Implementation of the hardware circuitry will be apparent to persons skilled in the relevant art(s). In yet another embodiment, features of the computer systems can be implemented using a combination of both general-purpose hardware and software.

Referring to FIGS. 1-11, a board 10 is disclosed. The board 10 may be a skateboard 11 or a balance board 13. The skateboard 11 may comprise one or more wheels 12 mounted on one on more axles 14 More than one wheel 12 may be mounted in each axle 14. The board 11 may comprise a deck 16. For a skateboard 11, the deck 16 may be connected to the axle 14. In some embodiments, the board 10 may be provided with or without the axles 14 or wheels 12. The deck 16 may include a top 18 and a bottom 20. The axle 14 may be connected to the bottom 20. A gripping surface 22 may be disposed on the top 18. The gripping surface 22 may be disposed on a portion of the top 18. The gripping surface 22 may be disposed along a substantial portion of the top 18. As used herein, a "substantial portion" means at least 25%, at least 40%, at least 50%, at least 60%, at least 75%, or at least 80% of the surface being referenced (e.g., the top 18). The top 18 and the gripping surface 22 are generally understood so as to be configured to support a person riding or standing on the board 10.

The gripping surface 22 may comprise a plurality of projections 24 extending away from the deck 16. The gripping surface 22 may comprise a plurality of voids (which may be also referred to as valleys) 26 disposed between, and defined by, the plurality of projections 24. The plurality of projections 24 and the plurality of voids 26 may alternate with one another and be evenly spaced with one another. In this way, the plurality of projections 24 and the plurality of voids 26 may be arranged in a geometric pattern, including a repeating geometric pattern, on the gripping surface 22 or at least across a portion of the top 18. The gripping surface 22 may contain at least 5, at least 10, at least 20, at least 30, at least 50, at least 75, at least 100, at least 150, at least 200, at least 250, or at least 500 plurality of projections 24. The gripping surface 22 may contain at least 5, at least 10, at least 20, at least 30, at least 50, at least 75, at least 100, at least 150, at least 200, at least 250, or at least 500 plurality of voids 26.

Advantageously, the plurality of projections 24 and the plurality of voids 26 on the gripping surface 22 increases surface area of the top 18, increasing contact grip between a person and the top 18. Moreover, the projections 24 and voids 26 are aesthetically pleasing and attractive. The projections 24 and the voids 26 may be disposed across the gripping surface 22. The projections 24 and voids 26 may be integrally formed (e.g., created by subtractive manufacturing, including a router, as later discussed) such that they are durable and mechanically strong with the top 18. Beneficially, this enables the projections 24 and voids 26 to be durable such that they resist breaking during use, which may be high, especially given that force exerted on the projections 24 and voids 26 may be high during use by a person.

As shown in FIGS. 10A-10F, the projections 24 may each have a generally pyramidal (including tetrahedral, pentagonal, or even further sides) profile or a generally trapezoidal (including tetrahedral, pentagonal, or even further sides) profile. The voids 26 may each have a corresponding and complementary profile to the profile of the projections 24. The projections 24 may each include a projection tip 28 disposed at the upper portion of the projections 24. The projections 24 may each include a first angled surface 30, a second angled surface 32, and a third angled surface 34. In some embodiments, the projections 24 may include a fourth angled surface 36 (in the case of a four-sided profile), a fifth angled surface (not shown, in the case of a five-sided profile), and so on. The angled surfaces 30, 32, 34, 36 may each extend upwardly and inwardly from the deck 16 toward the projection tip 28. Each of the angled surfaces 30, 32, 34, 36 may be disposed circumferentially around the projection tip 28.

Figure 1:
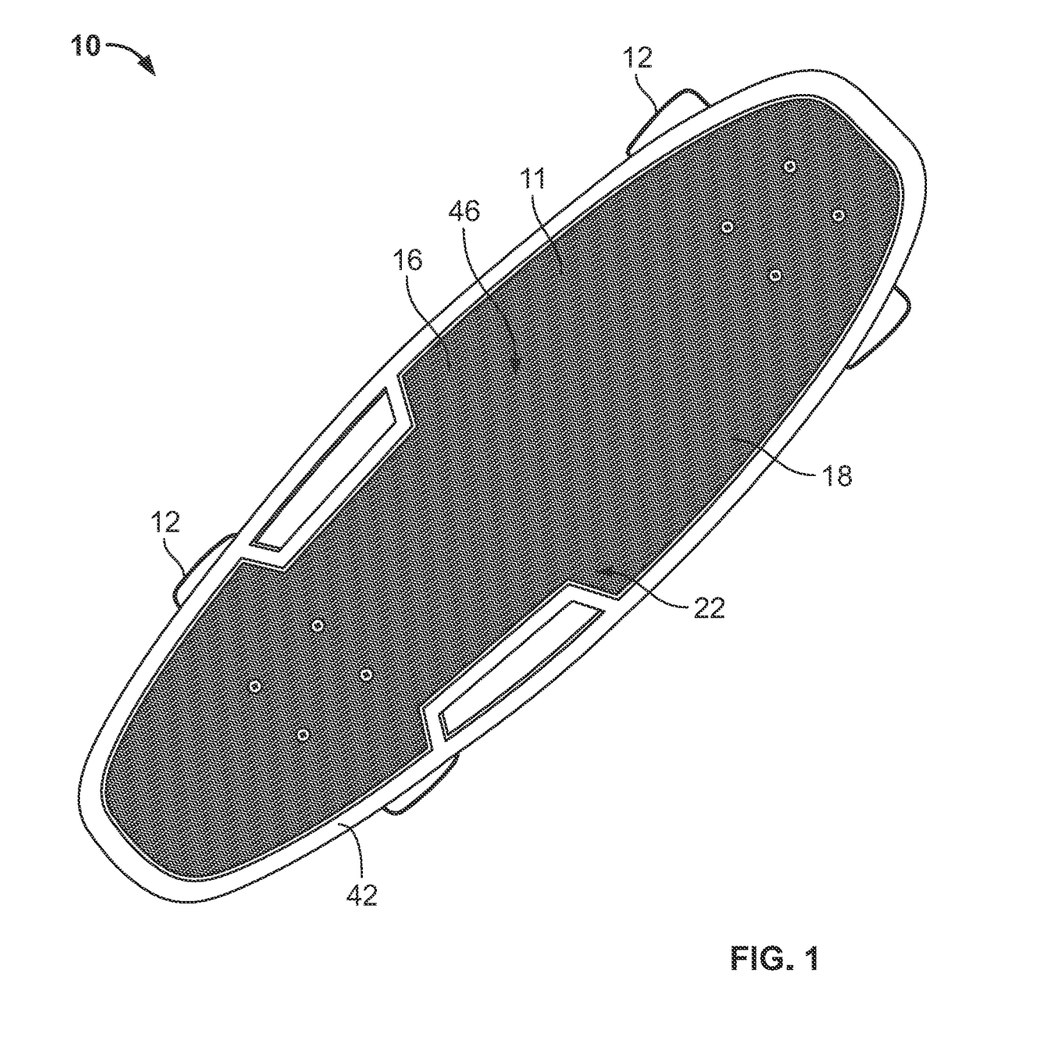
FIG. 1 shows a top view of one embodiment of a board.
Figure 2:
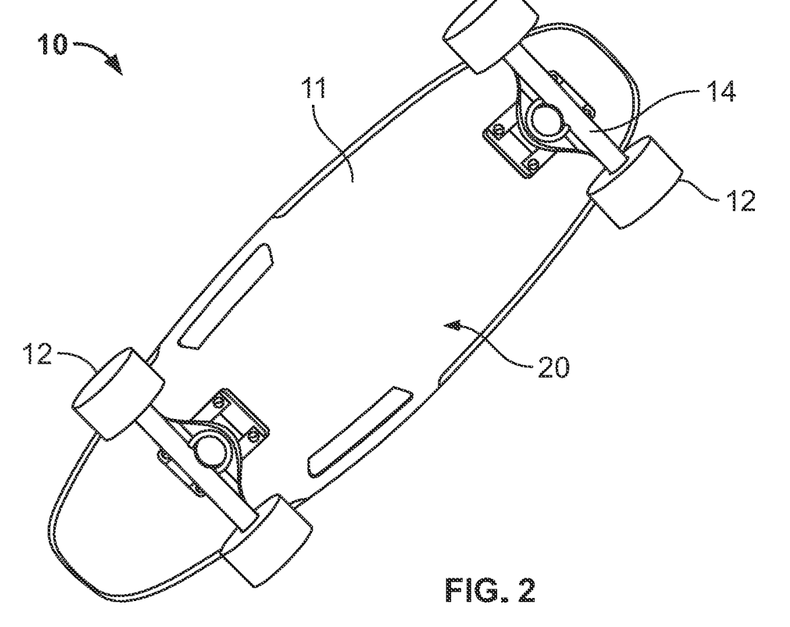
FIG. 2 shows a bottom view of the board shown in FIG. 1.
Figure 3:
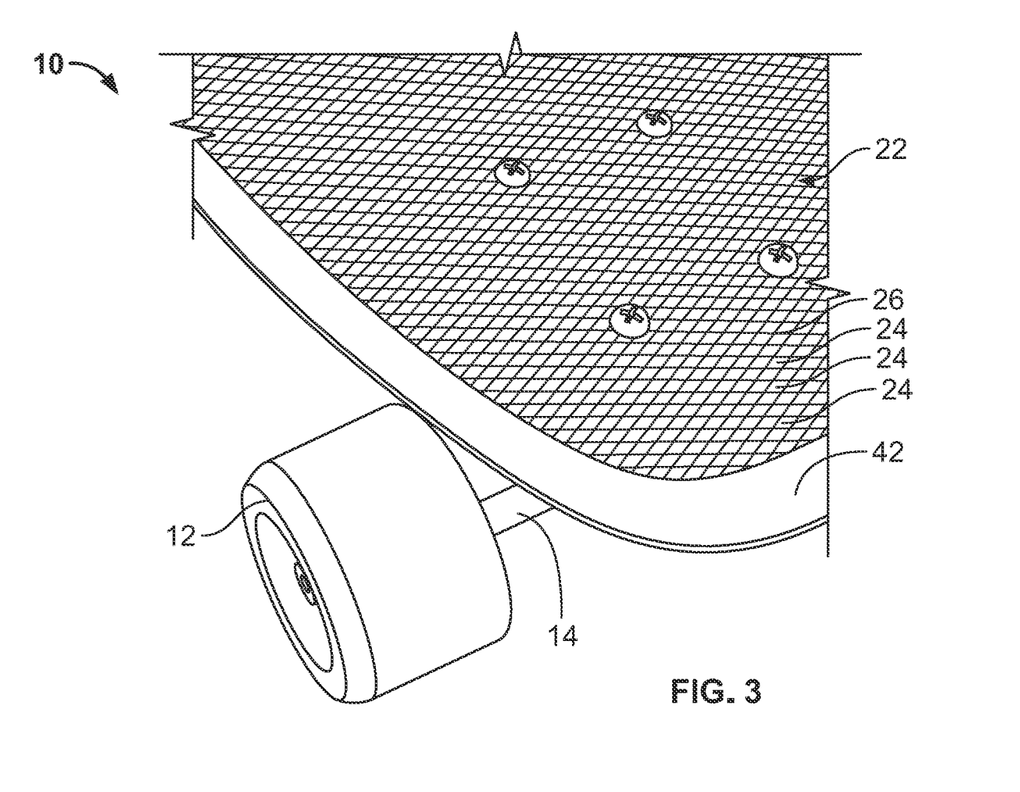
FIG. 3 shows a close-up front perspective view of the board shown in FIG. 1.
Figure 4A:
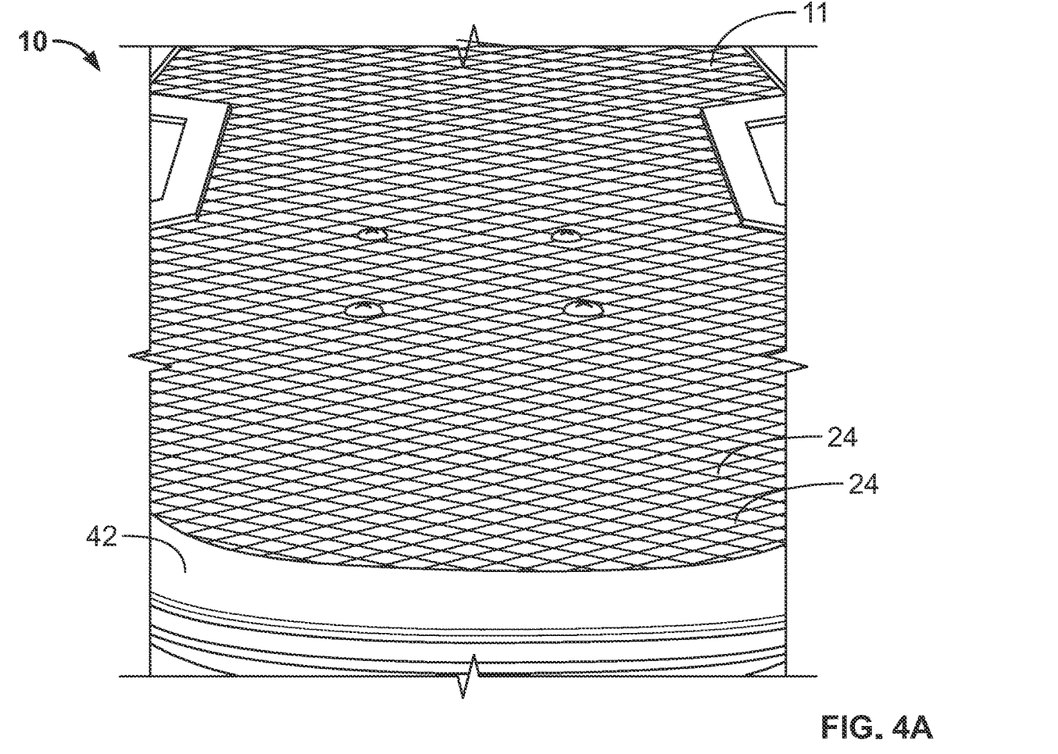
FIG. 4A shows a close-up rear view of the board shown in FIG. 1.
Figure 4B:
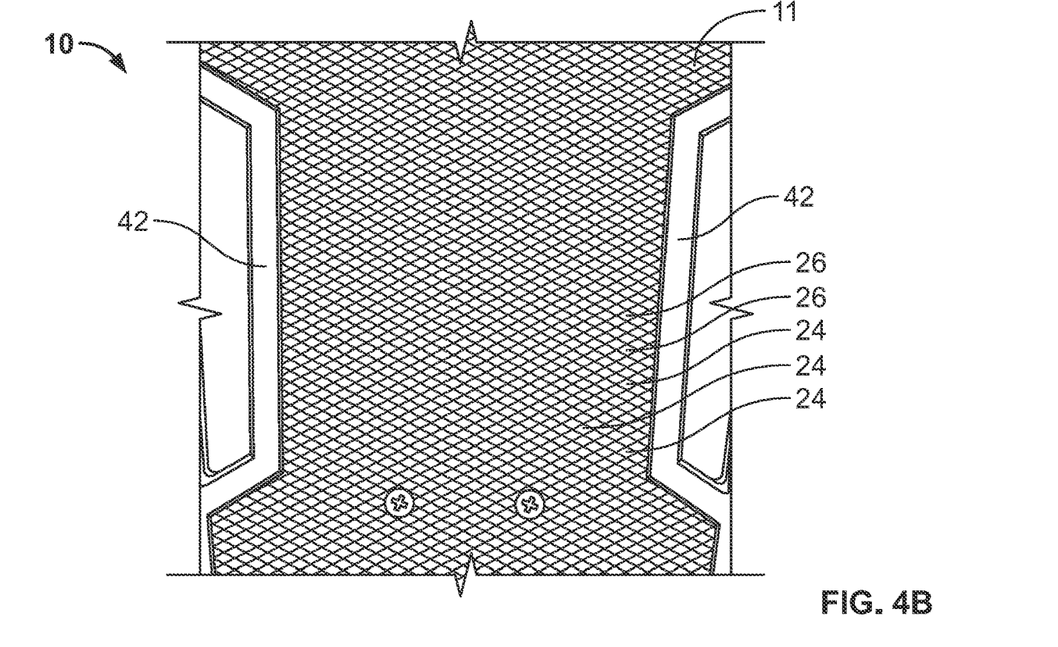
FIG. 4B shows a close-up top view of the board shown in FIG. 1.
Figure 4C:
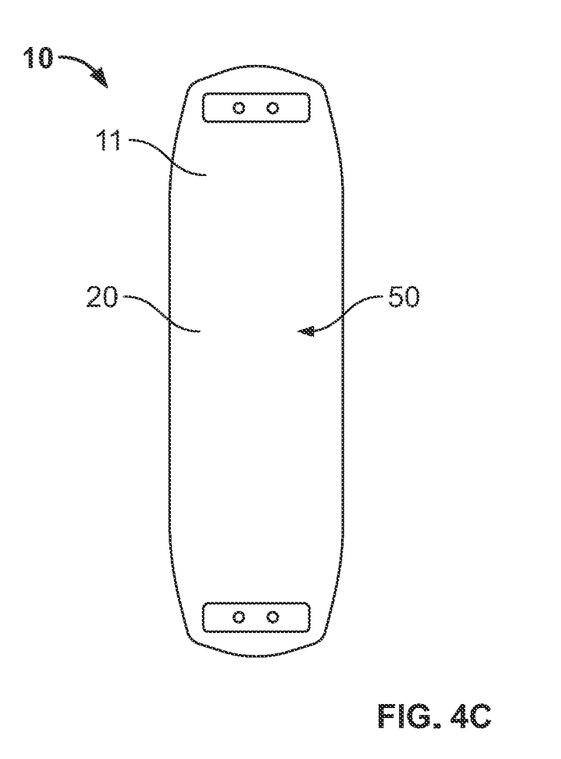
FIG. 4C shows a bottom view of the board shown in FIG. 1 without connected wheels.
Figure 5:
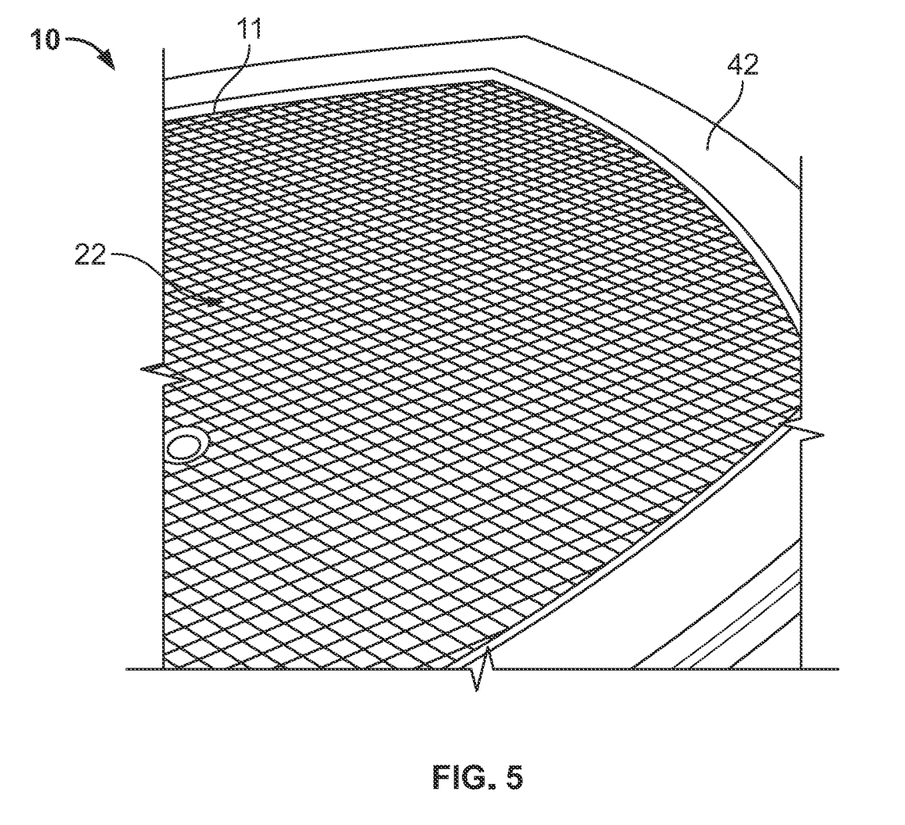
FIG. 5 shows a close-up perspective view of another embodiment of a board.
Figure 6A:
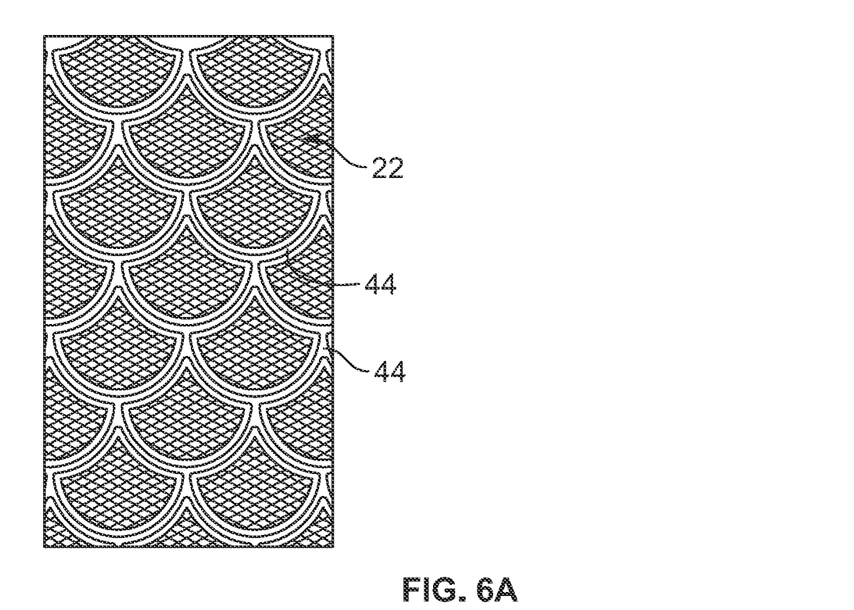
FIG. 6A shows a close-up top view of a gripping surface according to an embodiment.
Figure 6B:
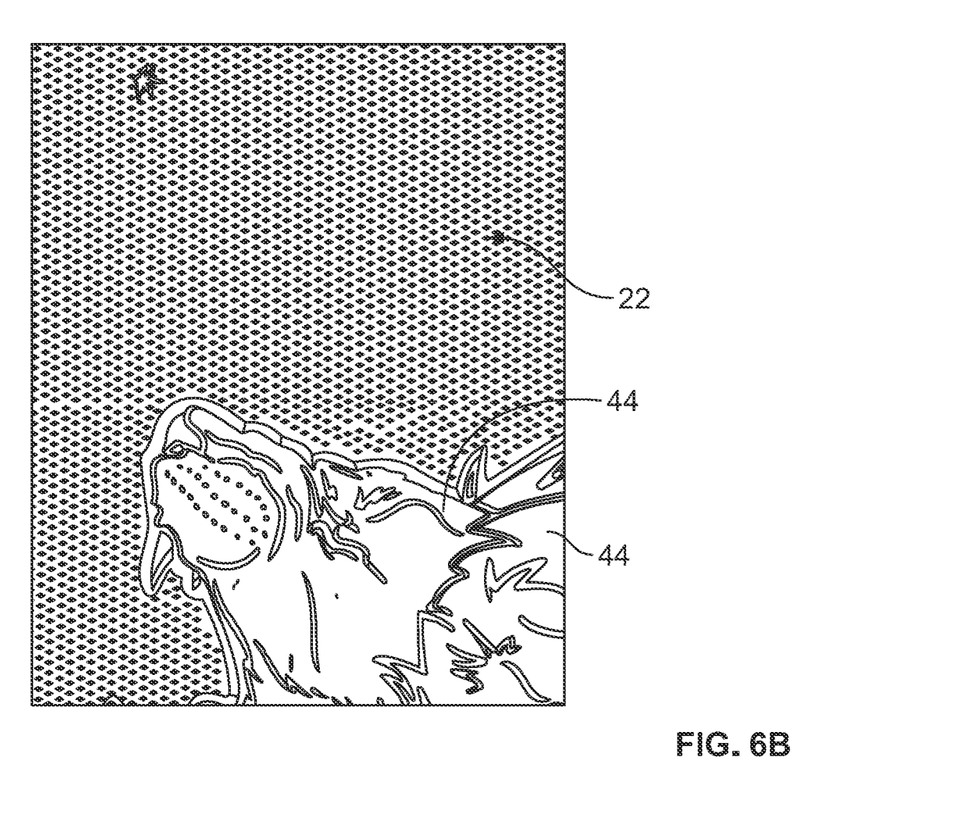
FIG. 6B shows a close-up top view of a gripping surface according to another embodiment.

The deck 16 may be constructed of any suitable material, such as a polymer, metal, or wood. In some embodiments, the wood may be multiple plies. The wood may be from any suitable tree or shrub species, including maple. The wood may be solid or be ply, such as at 2-ply, 3-ply, 4-ply, 5-ply, 6-ply, 7-ply, 8-ply, 9-ply, 10-ply, or more. A raised lip 42 may extend around the deck 16 on the top 18. The raised lip 42 may serve as a stop to prevent feet from slipping off the board 10, particularly the gripping surface 22, during use. The top 18 may comprise one or more raised walls 44. The raised walls 44 may define an aesthetic design, as shown in FIGS. 6A and 6B.

Figure 11:
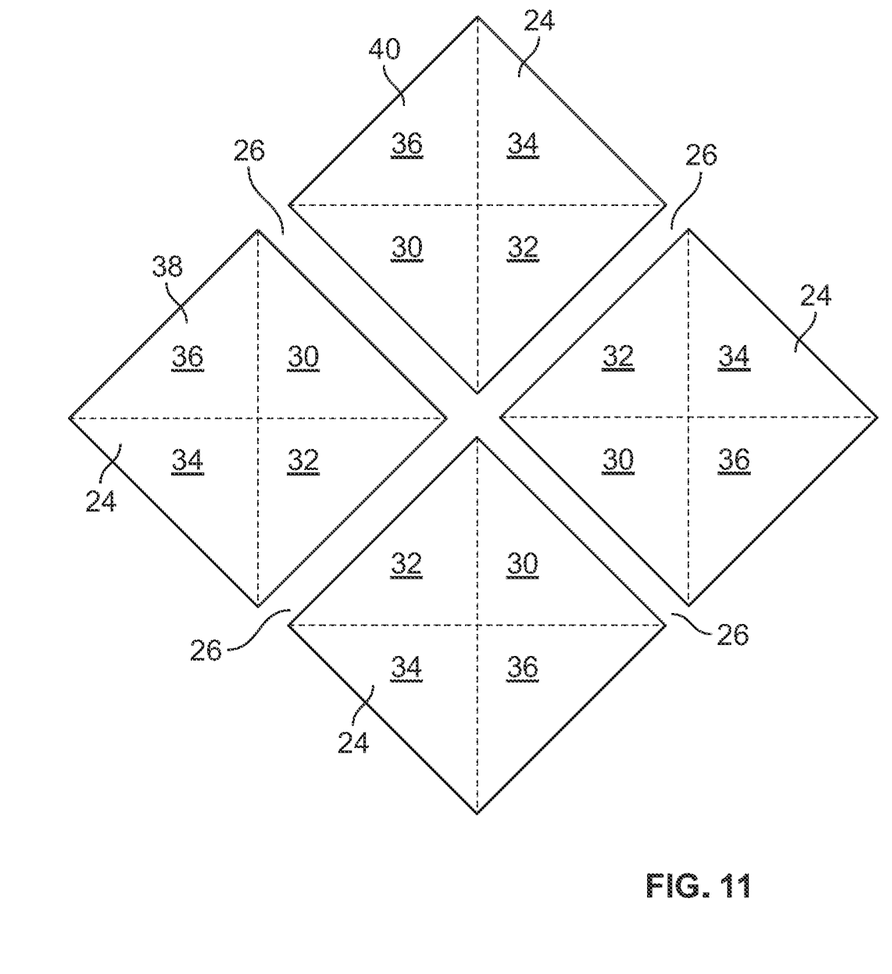
FIG. 11 illustrates projections according to an embodiment.

Referring to FIG. 11, the plurality of projections 24 may comprise a first projection 38 and one or more proximal projections 40. One of the angled surfaces 30, 32, 34, 36 of the one or more proximal projections 40 may be proximal to the angled surfaces 30, 32, 34, 36 of the first projection 38. In this way, the corresponding proximal surfaces 30, 32, 34, 36 of the first projection 38 and the second, proximal projection 40 may be considered to be mirrors or mirrored. By way of example, the angled surface 30 may slope upwardly 45 degrees and the corresponding proximal angled surface 30 of proximal projection 40 may slope downwardly 45 degrees. Any suitable angle may be utilized for the slopes.

In another aspect, a support surface 46 is provided. The support surface 46 may be any surface 46 that supports a person, particularly where maintaining desired contact between the person and the surface 46 is important. The support surface 46 may be selected from the group consisting of a wood flooring, a wood decking, a wood stair tread, a skateboard deck, a balance board deck, and a scooter deck. The support surface 46 comprises a body 48 having a bottom surface 50 and a top surface 52 (which may be the deck 18) oppositely disposed on the body 48 from the bottom surface 50. The support surface 46 comprises the gripping surface 22 disposed on the top surface 52 of the body 48.

In another aspect, a method of making or forming the gripping surface 22 is provided. The gripping surface 22 may be formed by cutting the top 18 or the top surface 52 to form the projections 24 and the voids 26. The cutting may be performed by a router 54, such as a computer numerical control (CNC) router 56, shown in FIG. 8. Examples of suitable CNC routers 56 include those available from Laguna Tools. The router 54 may comprise a bit 58. The bit 58 may have a rounded tip 60. The bit 58 may have a diameter of from 1/32" to 2", such as 1/32", 1/16", 1/8", 1/4", 3/8" 1/2", 5/8", 3/4" or 1". The computer numerical control (CNC) router 56 may be controlled by a computer system comprising programmable computer software configured to control cutting positions, including depth, of the router 54.

Unexpectedly, it was discovered that bits 58 having a rounded tip 60 are particularly advantageous for creating and cutting the projections 24 and the voids 26. Indeed, typically, rounded tips 60 are used for making fluted millwork or decorative designs where a groove having a constant radius is desired. However, while making the board 10, the bit 58 having a rounded tip 60 was used, and the projections 24 and voids 26 described herein resulted.

Figure 7A:
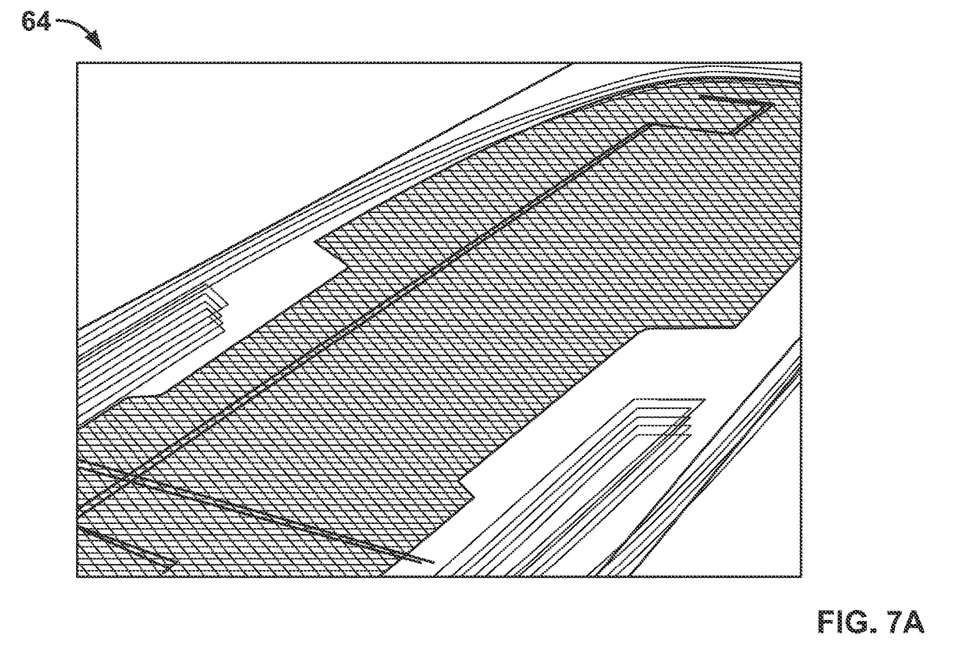
FIGS. 7A and 7B illustrate digital renderings.
Figure 7B:
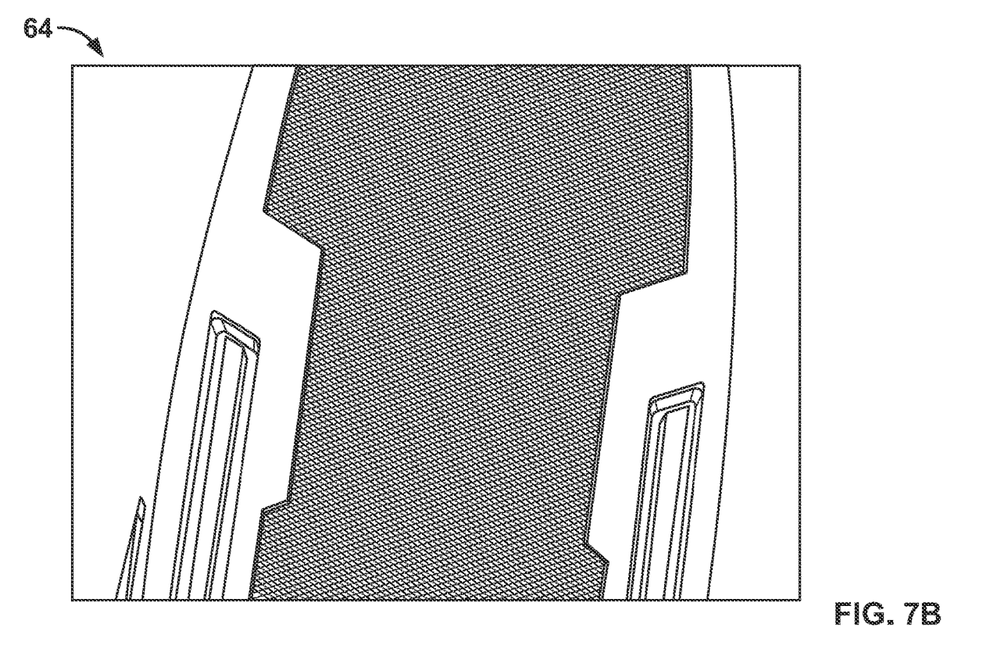
Figure 8:
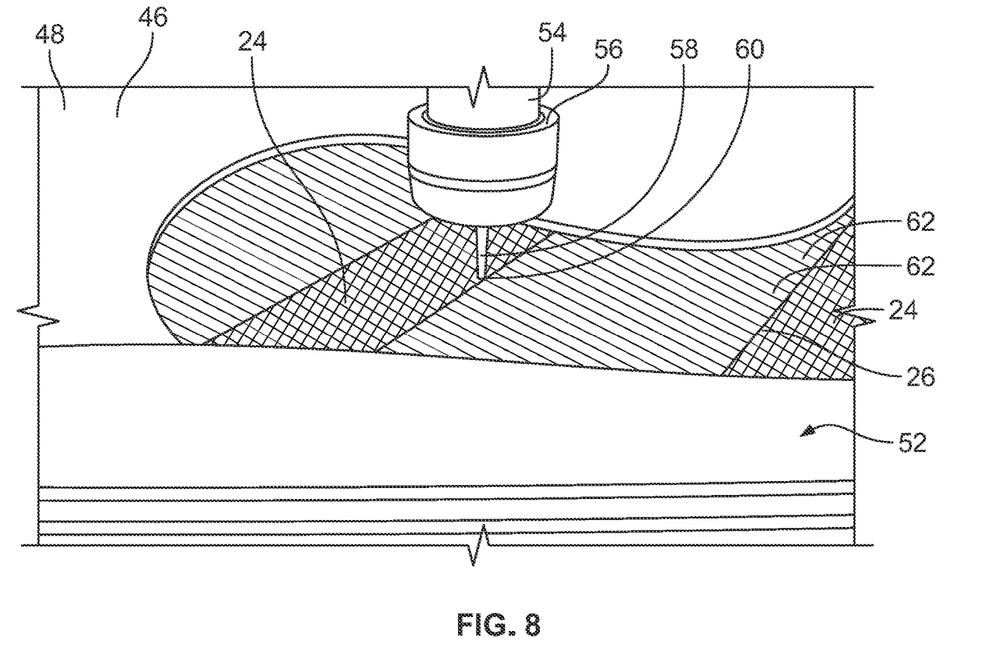
FIG. 8 shows a router cutting a top surface to make the projections and voids of the gripping surface.
Figure 9A:
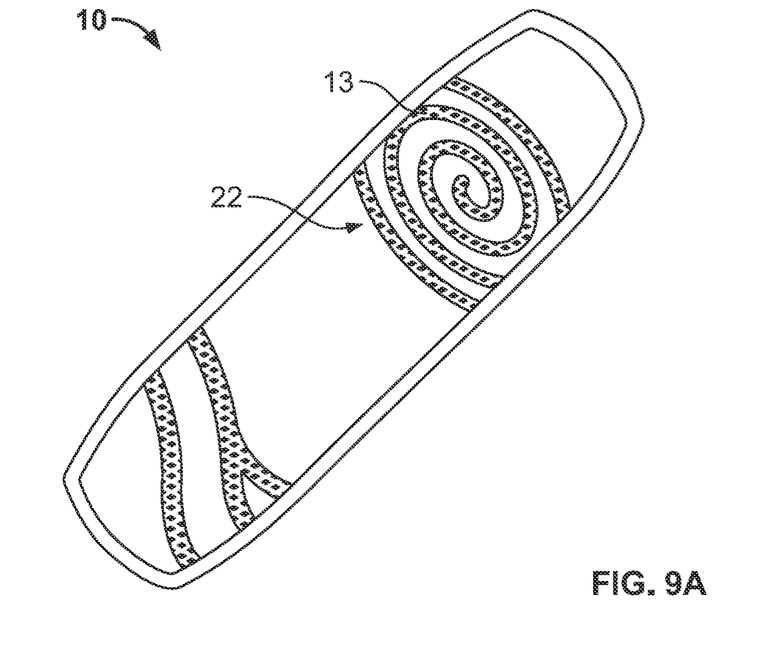
FIG. 9A shows a top view of a balance board according to an embodiment.
Figure 9B:
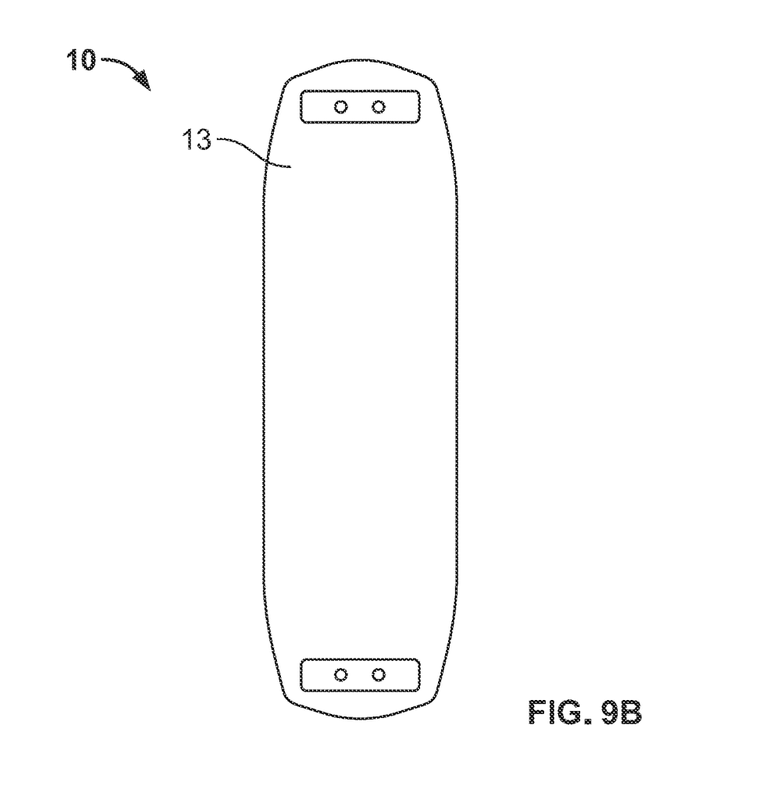
FIG. 9B shows a bottom view of a balance board of FIG. 9A.
Figure 10A:
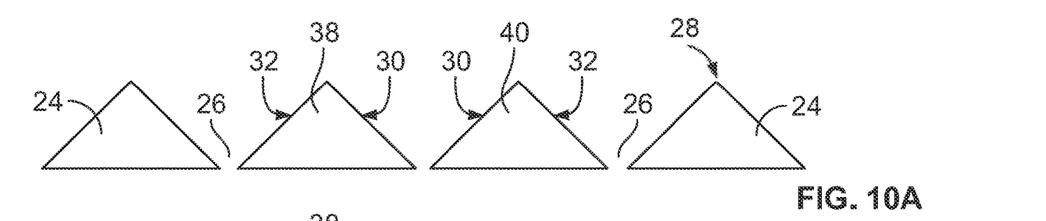
FIGS. 10A-10F illustrate a side view of a row of projections and the voids according to one embodiment.
Figure 10B:
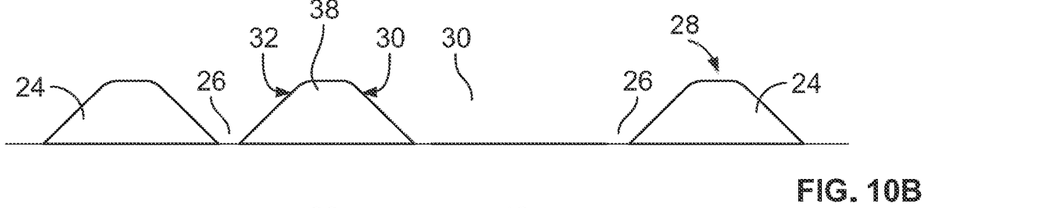
Figure 10C:
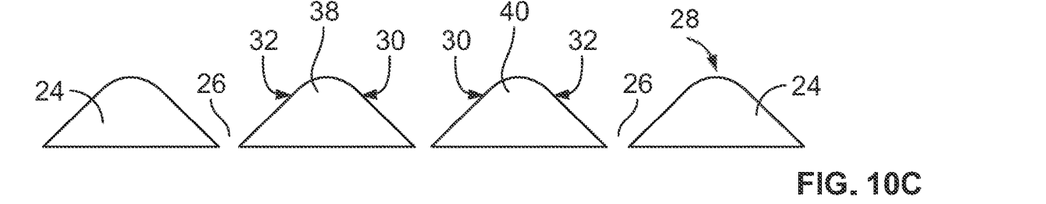
Figure 10D:
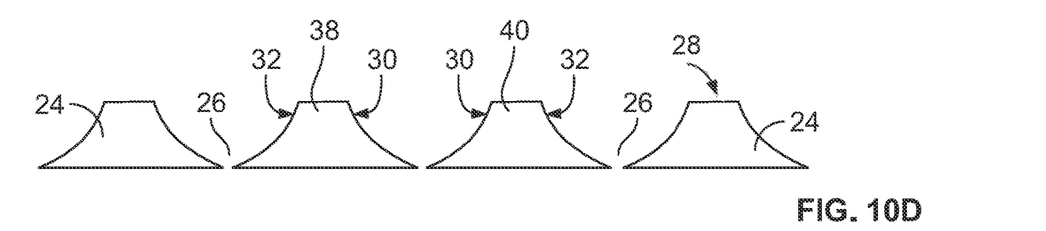
Figure 10E:
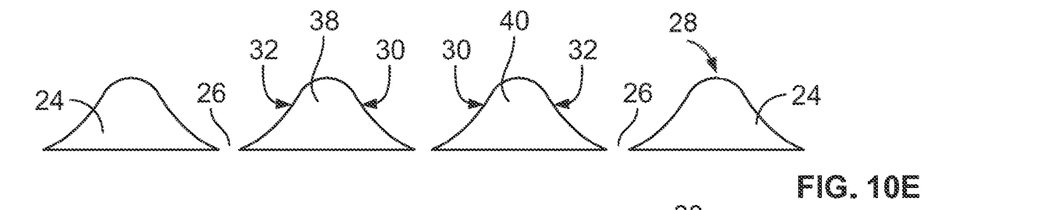
Figure 10F:
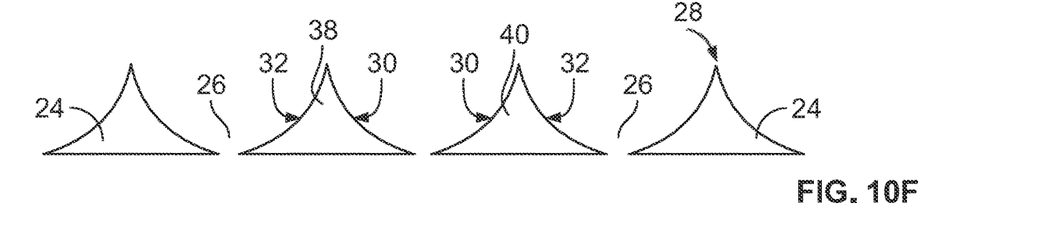

As shown in FIGS. 7A and 7B, the computer software may be programmable such that a digital rendering 64 of the board 10 or the support surface 46 is shown and desired locations and depths of cuts can be programmed, with lines depicting the desired location of cuts and depth of cuts when entered into the computer software) may be programmed and the CNC router 56 cuts at those programmed depths and cuts.

The computer software may be programmed such that the CNC router 56 makes a first series of parallel cuts, each separated by a stepover 62. Then, the computer software may be programmed such that the CNC router 56 makes a second series of parallel cuts that intersect the first series of parallel cuts. The first series of parallel cuts may be at an angle relative to the length of the board 10 of, for example, from 5 to 50, from 10 to 40, or from 15 to 30 degrees. Each series of second parallel cuts is separated by the stepover 62, thereby forming the projections 24 and the voids 26. The second series of parallel cuts may be at an angle relative to the length of the board 10 of, for example, from −5 to −50, from −10 to −40, or from −15 to −30 degrees. The width of the stepover 62 may be equal, or substantially equal, to the diameter of the bit 58. If this width is smaller than the diameter of the bit 58, no projection 24 will result. If the width of the stepover 62 is larger than the diameter of the bit 58, a non-cut area (such as the raised wall 44) will result rather than the projection 24. The computer software may be programmed so that the CNC router 56 performs intricate and aesthetically pleasing designs, as shown. Indeed, the computer software may be programmed so that the CNC router 26 does not cut certain areas (e.g., the raised walls 44).

In a method of making the board 10 and the support surface 46, a piece of wood (not shown) may be provided. The piece of wood may cut to the size and shape of the board 10 or as desired for the support surface 46. As discussed above, a router may be used to make a first series of parallel cuts that are parallel along a first direction. The router 54 may be used to make a second series of parallel cuts that intersect the first series of parallel cuts. The method may include programming a computer (not shown) configured to control a CNC router with instructions regarding the first and second series of cuts. Through the first and second series of cuts, the projections 24 and the voids 26 are formed. Some areas (e.g., the raised walls 44 or the raised lip 42) may not be cut. The board 10 and the support surface 46, including the gripping surface 22, may be smoothed (e.g., sanded). The board 10 and the support surface 46, including the gripping surface 22, may be sealed, painted, or treated after the projections 24 are formed, such as with a stain, a varnish, a paint, a lacquer, a coating, or a thermoplastic polymer (e.g., polyurethane).

Although embodiments of the disclosure have been described using specific terms, devices, and methods, such description is for illustrative purposes only. The words are words of description rather than of limitation. It is to be understood that changes and variations may be made by those of ordinary skill in the art without departing from the spirit or scope of the present disclosure, which is set forth in the following claims. It is further noted that any range provided herein provides support and a basis for any subset within that range. Further embodiments of the disclosure contain combinations, or exclusions, of different embodiments described herein.

Thus, although there have been described particular embodiments of the present invention of a new and useful gripping surface and methods of making the same, it is not intended that such references be construed as limitations upon the scope of this invention except as set forth in the following claims.

What is claimed is:

1. A board, comprising:
a deck including a bottom and a top disposed on the deck opposite of the bottom; and
a gripping surface disposed on the top, the gripping surface including:
a plurality of projections extending away from the deck, the plurality of projections each including:
a projection tip;
a first angled surface extending upwardly and inward to the projection tip from the deck;
a second angled surface extending upwardly and inwardly to the projection tip from the deck; and a third angled surface extending upwardly and inwardly to the projection tip from the deck, wherein each of the angled surfaces are disposed around the projection tip; and
a plurality of voids between and defined by the plurality of projections.

2. The board of claim 1, wherein the plurality of projections and the plurality of voids are arranged in a geometric pattern on the gripping surface.

3. The board of claim 1, wherein the plurality of projections each have a generally pyramidal profile or a generally trapezoidal profile.

4. The board of claim 1, wherein the deck is a skateboard deck or a balance board deck.

5. The board of claim 4, wherein the deck is constructed of wood.

6. The board of claim 1, wherein the plurality of projections and a plurality of voids are formed by cutting a portion of the deck at the gripping surface.

7. The board of claim 6, wherein the cutting is performed by a router.

8. The board of claim 7, wherein the router comprises a computer numerical control router.

9. The board of claim 1, further comprising a raised lip disposed around the gripping surface of the deck.

10. The board of claim 1, wherein the plurality of projections comprise a first projection and one or more proximal projections, and wherein one of the angled surfaces of each of the one or more proximal projections is a mirror of one of the angled surfaces of the first projection.

11. The board of claim 1, wherein the plurality of projections and voids are disposed across the gripping surface, and wherein the gripping surface is disposed on a substantial portion of the top.

12. The board of claim 1, further comprising one or more axles disposed on the bottom of the deck and one or more wheels mounted on the one or more axles.

13. A support surface, comprising:
a body having a bottom surface and a top surface oppositely disposed on the body from the bottom surface;
a gripping surface disposed on the top surface of the body, the gripping surface including:
a plurality of projections extending away from the body, and
a plurality of voids between and defined by the plurality of projections, wherein
each of the plurality of projections includes a projection tip;
a first angled surface extending upwardly and inwardly to the projection tip from the body;
a second angled surface extending upwardly and inwardly to the projection tip from the body; and
a third angled surface extending upwardly and inwardly to the projection tip from the body, wherein each of the angled surfaces are disposed around the projection tip.

14. The support surface of claim 13, wherein the support surface is selected from the group consisting of a wood flooring, a wood decking, a wood stair tread, a skateboard deck, a balance board deck, and a scooter deck.

15. The support surface of claim 13, wherein the gripping surface is disposed across a substantial portion of the top surface.

16. A method for creating a gripping surface on a substrate, comprising:
providing a substrate including a body having a top surface;
cutting the top surface to form a plurality of projections and a plurality of voids, each of the plurality of projections including:
a projection tip;
a first angled surface extending upwardly and inwardly to the projection tip from the body;
a second angled surface extending upwardly and inwardly to the projection tip from the body; and
a third angled surface extending upwardly and inwardly to the projection tip from the body, wherein each of the angled surfaces are disposed around the projection tip.

17. The method of claim 16, wherein the substrate is selected from the group consisting of a wood flooring, a wood decking, a wood stair tread, a skateboard deck, a balance board deck, and a scooter deck.

18. The method of claim 16, wherein the plurality of projections and the plurality of voids form a geometric pattern across at least a portion of the top surface.

19. The method of claim 16, wherein the cutting comprises:
a first series of cuts along parallel lines in a first direction; and
a second series of cuts along parallel lines in a second direction, wherein the second direction intersects the first direction.

20. The method of claim 19, wherein the first series of cuts and the second series of cuts are each spaced an equal stepover width from one another.

21. The method of claim 19, wherein the cutting is performed by a router having a rounded bit, and wherein the stepover width is equal to the diameter of the bit.

* * * * *